Nov. 23, 1965

R. DALLY 3,219,352

STYLUS CAPTIVATOR FOR PHONOGRAPH CARTRIDGE

Filed April 16, 1963

3 Sheets-Sheet 1

INVENTOR.
ROY DALLY,
BY Thomas A. Briody
HIS ATTORNEY.

Nov. 23, 1965 R. DALLY 3,219,352

STYLUS CAPTIVATOR FOR PHONOGRAPH CARTRIDGE

Filed April 16, 1963 3 Sheets-Sheet 2

INVENTOR.
ROY DALLY,
BY Thomas A. Briody
HIS ATTORNEY.

Nov. 23, 1965 R. DALLY 3,219,352

STYLUS CAPTIVATOR FOR PHONOGRAPH CARTRIDGE

Filed April 16, 1963 3 Sheets-Sheet 3

INVENTOR.

ROY DALLY,

BY

HIS ATTORNEY.

3,219,352
STYLUS CAPTIVATOR FOR PHONOGRAPH CARTRIDGE
Roy Dally, Warrensburg, Ill., assignor to General Electric Company, a corporation of New York
Filed Apr. 16, 1963, Ser. No. 273,469
8 Claims. (Cl. 274—25)

This invention relates to phonograph pickup cartridges such as the type having a rotatable stylus assembly therein, and more particularly to an arrangement for preventing inadvertent or undesirable removal of a stylus assembly from a phonograph pickup cartridge.

A well known type of phonograph cartridge employs a housing which contains one or more transducer elements, and a rotatable stylus assembly which is removable from the housing and mechanically connected to the transducer elements by means of coupler member. This coupler member mechanically interconnects the transducer elements and a drive rod of the stylus assembly, which is provided with one or more needles or styli for engaging the groove of a phonograph record.

In prior art phonograph cartridges, such as the well known type referred to, considerable difficulty has been encountered due to inadvertent uncoupling of the drive rod and undesirable removal of the stylus assembly from the cartridge housing. For example, when the housewife is dusting or cleaning the styli of the phonograph cartridge, the drive rod of the stylus assembly may be accidentally disconnected from the coupler member. As another example, when these cartridges are in stores or other public places, the stylus assemblies occasionally have been stolen or pilfered from their associated cartridges. It has therefore been found desirable to provide an improved phonograph cartridge which prevents any inadvertent uncoupling or undesirable removal of the stylus assembly therefrom.

An important object of my invention is to provide an improved phonograph cartridge having a stylus assembly held therein in secure fashion.

Another object of my invention is to provide an improved phonograph cartridge which includes a novel arrangement for preventing undesirable uncoupling or removal of a stylus from the cartridge.

A further object of my invention is to provide an improved phonograph cartridge wherein a single member cooperable with the cartridge housing is arranged to captivate and guard the stylus assembly therein.

A still further object of my invention is to provide an improved phonograph cartridge which is sturdy, dependable, efficient, and economical to manufacture.

Briefly, in accordance with my invention, in one embodiment thereof, I provide a phonograph pickup cartridge having a housing containing one or more transducer elements. The housing has on its underside a removable and rotatably supported stylus assembly including a drive rod. The drive rod is mechanically coupled to the transducer elements by means of a coupler. With this arrangement there is provided a specially arranged member which removably cooperates with the housing of the cartridge. This member includes a portion which underlies the drive rod of the stylus assembly and when the member is in engagement with the cartridge housing, it prevents uncoupling or removal of the stylus assembly therefrom. By using a single member in cooperation with the cartridge housing, a simplified and effective means has thus been provided for captivating the stylus assembly in the cartridge. This same means also serves as a guard for protecting the drive rod of the stylus assembly.

The features of my invention which I believe to be novel are set forth with particularity in the appended claims. My invention itself, however, both as to its organization and method of operation, together with further objects and advantages thereof, may best be understood by reference to the following description, taken in connection with the accompanying drawings, in which:

Figure 1:
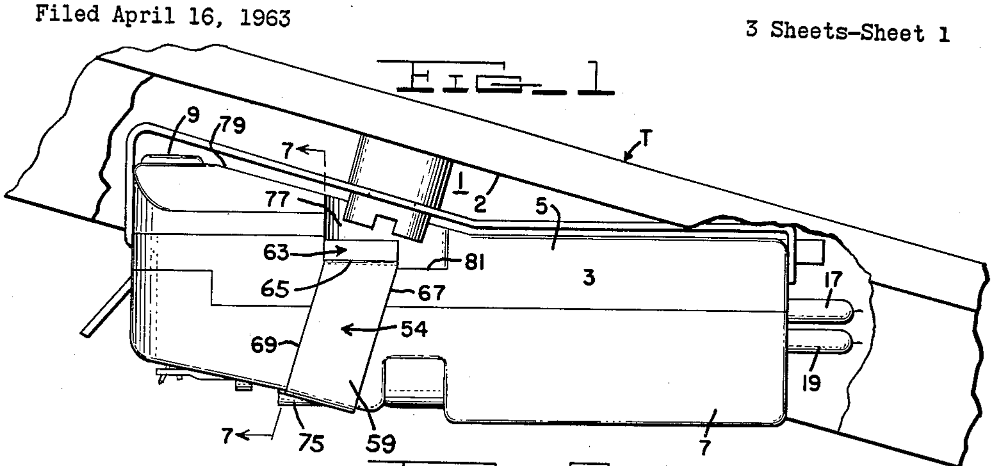
FIG. 1 is a side view of an improved phonograph pickup cartridge embodying my invention, the cartridge being shown mounted on the free end of a fragmentarily illustrated tone arm.
Figure 2:
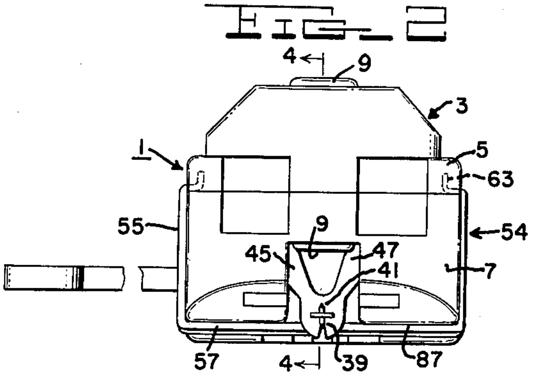
FIG. 2 is a front view of the cartridge shown in FIG. 1.
Figure 3:
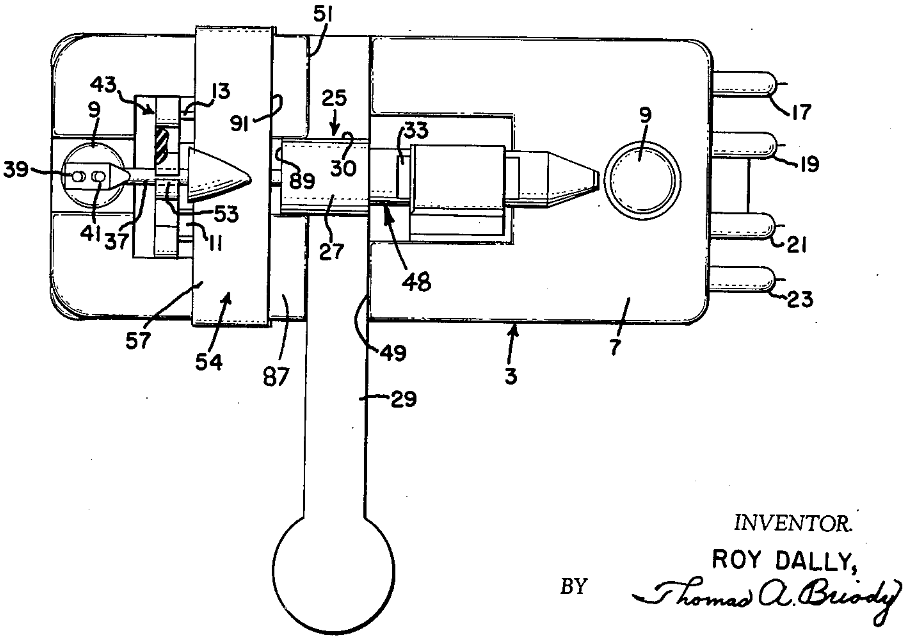
FIG. 3 is a bottom view of the cartridge shown in FIG. 1.
Figure 4:
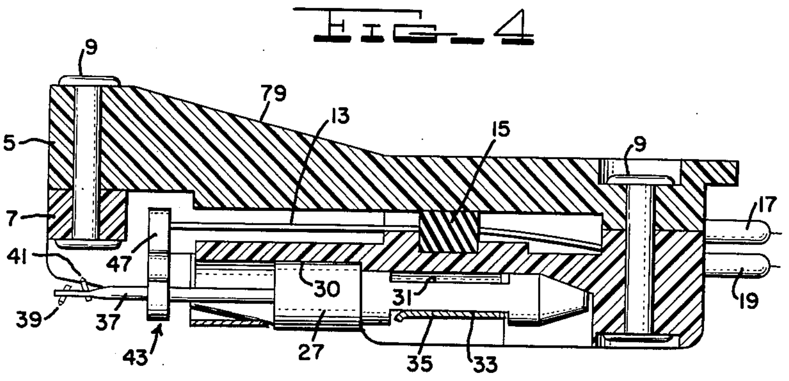
FIG. 4 is a cross-sectional view taken generally on the line 4—4 of FIG. 2.
Figure 7:
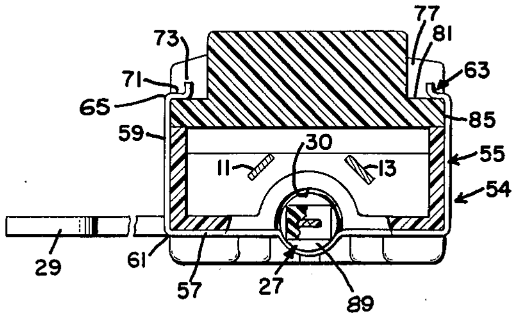
FIG. 7 is a cross-sectional view taken generally along the lines 7—7 of FIG. 1.

Referring first to FIGS. 1 and 2, there is illustrated a ceramic stereo pickup cartridge 1 embodying my invention. The cartridge 1 is suitably mounted within the recessed underside 2 of tone arm T, and comprises a housing 3 which may be composed of an upper part 5 and a lower part 7 attached together by means of rivets 9. The interior of the housing 3 is partially hollow (as shown in FIGS. 3, 4 and 7) and contains a pair of elongated ceramic transducer elements 11 and 13. The transducer elements 11 and 13 are anchored to the housing 3 at the rear ends thereof by suitable means such as resilient blocks 15 (FIG. 4), and are arranged mutually parallel, with the sides thereof inclined oppositely at 45 degree angles (relative to the horizontal, viewing FIG. 7). The elements 11 and 13 preferably are in the shape of flat bars, as shown in FIG. 7, and are provided with metallic electrodes (not shown) deposited or attached to their flat side surfaces. Suitable connecting wires (not shown) extend from these electrodes to terminal pins 17, 19, 21 and 23 at the rear of the cartridge housing 3.

A stylus assembly 25 comprises a barrel member 27 seated just within the underside of the housing 3 (FIGS. 3 and 6), and adapted to rotate 180 degrees about an axis parallel to the general axis of the housing 3. The barrel 27 is manually rotatable by means of a lever arm 29 which extends laterally therefrom and is long enough to extend beyond the sides of the housing 3. To facilitate the seating of the barrel member 27 against the underside of the cartridge housing 3, the housing 3 is provided with a curved seating region 30 (FIGS. 3 and 7) into which the barrel member 27 fits for rotation with respect to the housing 3. The barrel member 27 is flattened at opposite sides thereof as indicated at 31 and 33 (FIG. 4), and a spring clip 35 is arranged to ride against the barrel member 27 so as to engage against the flattened portions 31, 33 alternatively when the barrel is at the two extremes of its 180 degree rotation, as determined by which side of the housing 11 the arm 29 extends from. An end of the clip 35 is attached to the housing 3, by screws, or by fitting into a slot in the housing, or by other suitable means.

An elongated drive rod or tube 37 is concentric with, carried by, and extends axially forwardly of, the barrel 27, as shown in FIG. 4. The front end of the drive rod 37 is provided with two styli 39 and 41, arranged on opposite sides of the drive rod 37 and extending laterally therefrom, so that when the barrel 27 is in one of its two extreme rotary positions, one of the styli 39 will extend downwardly in record playing position, and when the barrel 27 is in its other extreme rotary position, the other stylus 41 will extend downwardly in record playing position. A convenient way to attach the styli 39, 41 to the drive rod 37 is to flatten the front end of the drive rod 37, as shown, and drill holes at suitable angles into the flattened front end of the drive rod, into which the styli 39, 41 may be inserted and held by means of an adhesive or cement.

A V-shaped coupler 43, which may be made of suitable resilient material, connects the drive rod 37 to the two transducer elements 11, 13, as shown in exemplary fashion for element 13 in FIG. 4, by means of the coupler legs 45, 47 (FIG. 2).

The curved barrel-seating region 30, and the barrel 27, are located in a recess 48 provided in the underside of housing 3, and this recess 48 includes a pair of aligned slots 49, 51 (FIG. 3) which are slightly wider than the width of the lever arm 29. The slots 49, 51 open downwardly and laterally from the curved seating region 30 for barrel 27, and are formed in the housing 3 so that the lever arm 29 enters the slots respectively at the two extreme rotatable positions, which are angularly spaced apart by 180 degrees. Thus, the slots 49, 51 establish the rotational limits of the lever arm 29. In addition, since the slots 49, 51 are only slightly wider than the width of the lever arm 29, when the lever arm 29 is in either slot, it properly positions the barrel 27 and the entire stylus assembly 25 longitudinally with respect to the cartridge housing.

Figure 6:
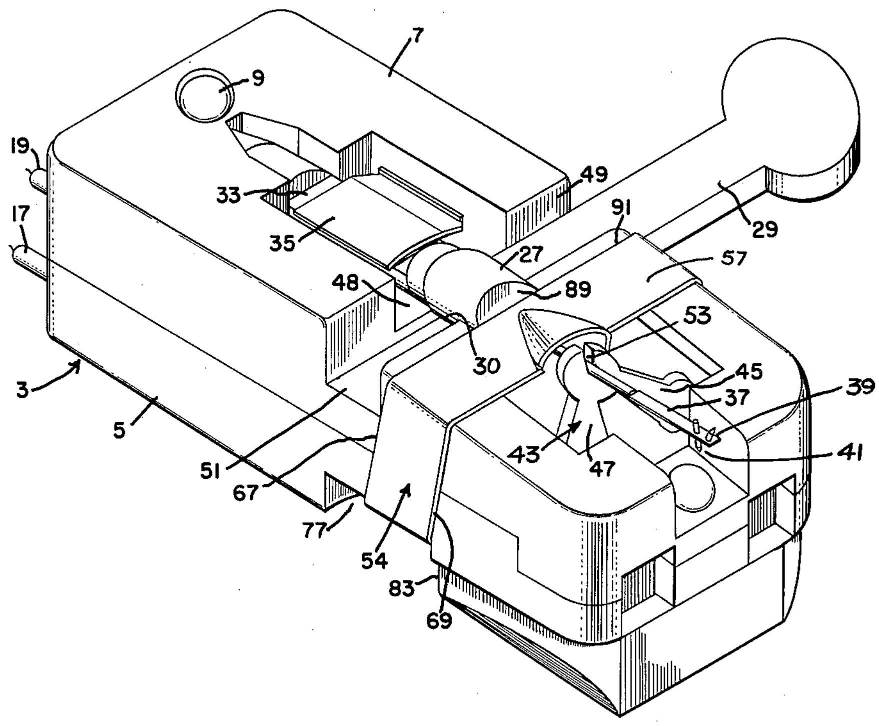
FIG. 6 is a perspective view of the phonograph pickup cartridge of FIG. 1.

Turning now to an important aspect of my invention, which concerns itself with a means for expeditiously captivating the stylus assembly 25 in cartridge 1, attention is first directed to FIGS. 1, 3 and 6. As shown therein, a substantially U-shaped clip 54 is in cooperative engagement with housing 3. When the clip 54 is in cooperative engagement with cartridge housing 3, the stylus assembly 25 cannot be removed from the cartridge. To facilitate an understanding of the importance of clip 54, the structure, arrangement, and mode of operation of the stylus assembly 25 shall first be described for when the clip is disengaged or absent from the cartridge. Thus, when the clip 54 is disengaged from the cartridge housing, the structure and arrangement of the stylus assembly 25 in the cartridge 1 is such that the stylus assembly 25 may be readily removed from and inserted into the cartridge. More particularly, to remove the lever arm 29 from the cartridge, it is first turned midway between its two operating positions so that it extends downwardly from the cartridge (i.e., through an angle of approximately 90 degrees from one of its seating slots 49, 51). The clip 35 is then not in engagement with either of the flattened portions 31, 33 of the barrel, and hence the stylus assembly 25 can be slid forwardly by pulling the lever arm forwardly. When the forwardly moving barrel 27 engages the coupler 43, the coupler becomes bent and the drive rod 37 slips out of engagement with the coupler, via slit 53 of the coupler. As shown in FIG. 6, the slit 53 is located between the opening for the drive rod and the bottom extremity of the coupler. The stylus assembly 25 is then free from the housing. An alternative way of removing the stylus assembly 25 from the housing 3 involves tilting the stylus assembly downwardly at its front end by pulling downwardly on the lever arm 29 when enough of the barrel 27 has been removed from the spring clip, to slide the drive rod through the coupler slit 53. In this manner the stylus assembly may also be readily freed from the housing 3.

To insert the stylus assembly 25 in the cartridge, with the clip 54 disengaged therefrom, the assembly 25 is slid backwardly to seat the barrel 27 in the seating region 30 under clip 35, and the drive rod is then pressed through slit 53 and into position on the coupler 43. The lever arm 29 is then turned into one of the slots 49, 51 to bring the desired one of the styli 39, 41 into operating position.

Figure 8:
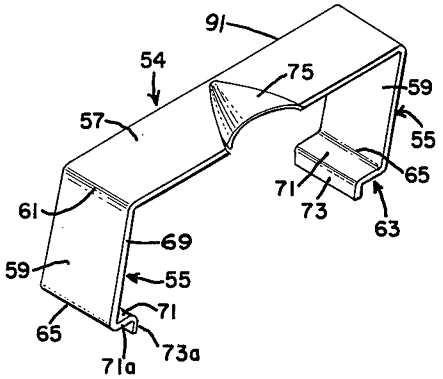
FIG. 8 is a perspective view of a stylus captivating member embodying one form of my invention.

To protect the cartridge 1 from unintentional uncoupling and undesirable removal of the stylus assembly 25, in accordance with the present invention, the aforementioned U-shaped clip 54 has been provided. As best shown in FIGS. 6 and 8, the clip 54 includes a pair of oppositely disposed resilient arms 55 for gripping the cartridge housing 3, the arms 55 being joined together by connecting portion 57, which serves as a guard for protecting and captivating the stylus assembly 25. More particularly, each of the resilient arms 55 includes an elongated flat section 59 disposed in perpendicular relationship to connecting portion 57 and joined thereto at bend 61. Near the free end of each elongated section 59 there is formed in clip 54 a substantially L-shaped shoulder 63 connected to section 59 by bend 65. As shown in FIG. 1, the bend 65 is diagonal to the longitudinal axis of elongated section 59 so that the rearward edge 67 of section 59 is longer than the forward edge 69 thereof. It will thus be seen that elongated section 59 is longer at its rear than at its front. The purpose of such an arrangement is to enable the sections 59 to conform in diagonal fashion to the sides of the housing 3 of the illustrated cartridge 1, as shall become apparent hereinafter.

As further shown in FIGS. 7 and 8, the L-shaped shoulder 63 comprises a gripping flange 71 which extends inwardly and perpendicularly from section 59 and is disposed in parallel overlying relationship to connecting portion 57. Each shoulder 63 also includes a tongue-like upright 73 extending upwardly and perpendicularly from flange 71 and disposed in generally parallel and offset relationship to its associated elongated section 59.

As further shown in FIGS. 6 and 8, the connecting portion 57 is of generally flat construction, and has a clearance 75 between its ends to avoid any undesirable interference of the clip 54 with the drive tube 37.

Figure 5:
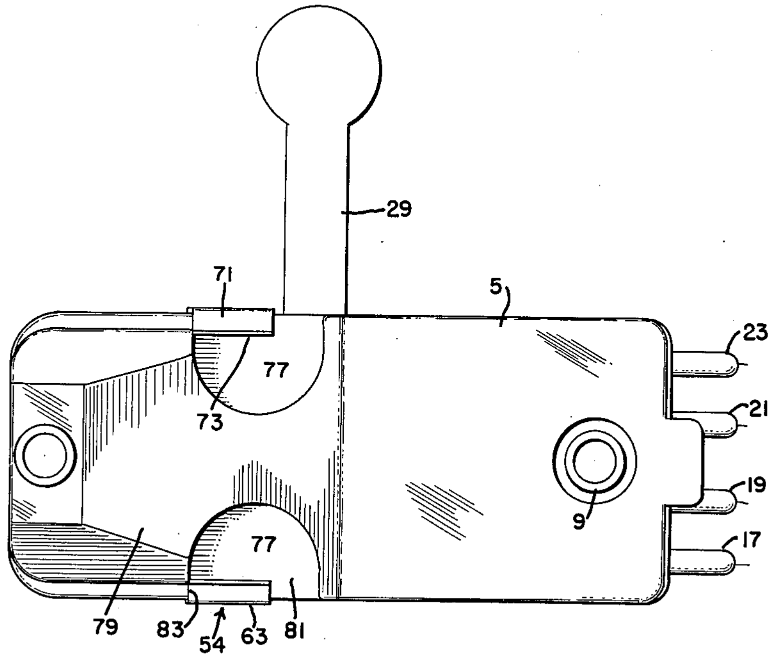
FIG. 5 is a top view of the cartridge shown in FIG. 1.

When the U-shaped clip 54 of the present invention is being installed on the cartridge 1, the arms 55 are first spread further apart from their normally upright position (FIG. 2) to the desired extent and the clip is moved upwardly from underneath the cartridge housing 3 (viewing FIG. 1) so that the L-shaped shoulders 63 are located adjacent the opposed stepped recesses 77 of upper inclined surface 79 of housing part 5 (see also FIG. 5). From such a position of the clip 54, the resilient arms 55 may thereupon be released and their free ends are snapped toward each other into cooperative engagement with the stepped recesses 77 of the cartridge housing.

As shown in FIGS. 1, 2, 5 and 6, the flange 71 of each resilient arm 55 then frictionally engages the bottom surface 81 of its associated recess 77, and the forward edges 71*a* and 73*a* (FIG. 8) of flange 71 and upright 73 (i.e., the edges thereof adjacent forward edges 69 of each arm 55) engage a forwardly located vertical wall 83 of recess 77. As further shown in FIG. 7, the inner parts of the bends 65 of clip 54 are contiguous to corners formed by the bottom surface 81 and vertical outer wall 85 of the upper housing part 5. The elongated sections 59 of the clip arms 55 extend downwardly and angularly forward from their associated L-shaped shoulders 63 (FIG. 1), and are disposed in contiguity to the outer vertical walls of the cartridge housing (FIG. 2).

As further shown in FIGS. 2 and 3, when the captivating clip 54 has been snapped into cooperative engagement with the cartridge, the connecting portion 57 snugly engages the inclined bottom surface 87 of lower housing part 7 and the longitudinal axis of the portion 57 is arranged in generally perpendicular relationship to the longitudinal axis of the cartridge housing 3. With such an arrangement of the clip 54, as shown in FIGS. 3 and 6, the forward vertical wall 89 of barrel member 27, which supports the drive rod 37, is disposed a relatively small distance behind the rearwardly facing transverse edge 91 of the connecting portion 57. The clearance 75 underlies the drive rod 37 between coupler 43 and barrel member 27.

Turning now to an explanation of the operation of the stylus captivating clip of my invention, attention is directed to FIGS. 1 and 6. When the clip 54 is resiliently engaged with the cartridge, the shoulders 63 of the clip and their seating recesses 77 of the cartridge housing, are located within the recessed underside 2 of the tone arm T, and when the lever arm 29 is rotated to an intermediate position to remove the stylus assembly 25, removal of the stylus assembly is obstructed and prevented by engagement of the forward vertical wall 89 of the barrel member 27 with transverse edge 91 of the clip connecting portion 57. It should also be understood that removal of the stylus assembly might alternatively be obstructed by engagement of the lever 29 with edge 91 of the clip. By means of my clip 54, it will thus be seen that the stylus assembly 25 cannot be inadvertently uncoupled or undesirably removed from the cartridge 1.

In the event that removal of the stylus assembly 25 becomes desirable, all that is required is to first remove the captivating clip 54 from the cartridge housing, such as, for example, by first prying the resilient arms 55 apart, and then pulling the clip downwardly to disengage it from the cartridge housing. When the captivating clip 54 has been removed from the cartridge, the stylus assembly 25 then may be readily removed in the aforedescribed manner.

When the captivating clip 54 is cooperatively engaged with the cartridge 1, it will be understood by those skilled in the art, that it does not interfere with the operation of the cartridge in any way. Thus, by means of the positioning of the clearance 75 on the connecting portion 57 of the clip, the drive rod 37 is effectively captivated without adversely interfering with the rotatable adjustment and operation of the stylus assembly 25.

It will now therefore be seen that the present invention provides a new and improved phonograph cartridge assembly wherein the stylus assembly is readily removable and effectively captivated in secure fashion. The stylus captivating member of my invention serves as an effective guard for preventing undesirable dislodgement of the drive rod of the stylus assembly from its coupling. It will further be understood that stylus captivating members such as the one disclosed herein may be readily incorporated in a wide variety of prior art cartridges without requiring any substantial variations of the design of these cartridges. It will also be realized that cartridges employing my invention are dependable, efficient, and economical to manufacture.

While in accordance with the patent statutes, I have described what at present is considered to be the preferred embodiment of my invention, it will be obvious to those skilled in the art that various changes and modifications may be made therein without departing from my invention, and I, therefore, aim in the following claims to cover all such equivalent variations as fall within the true spirit and scope of this invention.

What I claim as new and desire to secure by Letters Patent of the United States is:

1. A phonograph pickup cartridge comprising a housing, a stylus assembly removably supported in said housing, and a clip resiliently cooperable with said housing, said clip being separate from said housing and removably arranged thereupon, said clip being operably independent of said stylus assembly and normally spaced from said stylus assembly when said clip is arranged upon said housing, thereby to captivate said stylus assembly and prevent removal of the stylus assembly from the housing, while not in any way interfering with the normal operation of said stylus assembly.

2. A phonograph pickup cartridge comprising a housing, at least one transducer element within said housing, a stylus assembly removably supported in said housing, said stylus assembly including an elongated drive rod having at least one stylus on its free end, coupling means for mechanically interconnecting said drive rod and said transducer element, and a clip resiliently cooperable with said housing, said clip being separate from said housing and removably arranged thereupon, said clip being operably independent of said stylus assembly and normally in spaced apart underlying adjacency relative to said drive rod when said clip is arranged upon said housing, thereby to captivate said stylus assembly in said housing and prevent disengagement of the stylus assembly from said coupling means, while having no effect upon the normal operation of said stylus assembly.

3. A phonograph pickup cartridge comprising a housing having top, bottom and side walls, at least one transducer element within said housing, a stylus assembly recessed into the bottom wall of said housing and removably supported therein, said stylus assembly including an elongated drive rod having at least one stylus on its free end, coupling means for mechanically interconnecting said drive rod and said transducer element, and a clip at least partially underlying said drive rod, said clip being separate from said housing and removably arranged on said housing, said clip being operably independent of said stylus assembly and normally in spaced apart underlying adjacency relative to said drive rod when said clip is arranged upon said housing, thereby to captivate said stylus assembly in said housing and prevent disengagememnt of the drive rod from said coupling means, while having no effect upon the normal operation of said stylus assembly.

4. A cartridge as claimed in claim 3, wherein the clip has a substantially U-shaped configuration, said clip including a connecting portion underlying the drive rod and disposed on a bottom wall of said housing, and a pair of opposed arms generally disposed on opposite side walls of said housing, said arms having shoulders on their outer ends for snapping-in cooperation with recesses of the top wall of the housing thereby to secure the clip to the housing.

5. A phonograph pickup cartridge comprising a housing having top, bottom and side walls, at least one transducer element within said housing, a stylus assembly removably and rotatably positioned in said housing adjacent said bottom wall, said stylus assembly including an elongated drive rod having at least one stylus on its free end, a coupler for rotatably supporting a portion of said drive rod and connecting said drive rod to said transducer element, and a substantially U-shaped clip separate from said housing and removably cooperable therewith, said clip including two opposed arms positioned upon the side walls of the housing and a connecting portion stretched across the bottom wall of said housing, said arms each having a bent over free end arranged to resiliently cooperate with an associated recess formed in the top wall of said housing thereby to snap said clip into engagement with the housing of said cartridge, said connecting portion extending in a direction transverse to the longitudinal axis of said drive rod and disposed underneath said drive rod, said clip being operably independent of said stylus assembly and normally in spaced apart adjacency relative to said drive rod when said clip is arranged upon said housing, thereby to captivate said stylus assembly in said housing and prevent disengagement of said drive rod from said coupler, while having no effect upon the normal operation of said stylus assembly.

6. The cartridge as claimed in claim 5 wherein the bent over free end of each of the arms of the clip has a generally L-shaped configuration, said end including one leg which overlies said connecting portion and engages said recess and a tongue which extends upwardly from said leg for ready engagement to remove said clip from said housing.

7. A phonograph pickup cartridge comprising a housing, a stylus assembly supported in said housing, and means separate from and removably secured to said housing for captivating said stylus assembly in said housing, said captivating means being operably independent of said stylus assembly and in normally spaced apart adjacency to said stylus assembly when said captivating means is secured to said housing, thereby to captivate said stylus assembly in said cartridge while not in any way interfering with the normal operation of said stylus assembly.

8. A phonograph pickup cartridge comprising an elongated housing having top, bottom and side walls, at least one transducer element arranged within said housing with its longitudinal axis generally parallel to the longitudinal axis of said housing, a stylus assembly removably and rotatably positioned substantially in a recess formed in the bottom wall of said housing, said stylus assembly including an elongated drive rod having its longitudinal axis parallel to the longitudinal axis of said housing, at least one stylus on the free end of said drive rod, a resilient coupler disposed in said housing in spaced proximity to the free end of said drive rod and connecting said drive rod to said transducer element, and a substantially U-shaped clip separate from and independent of said housing, said clip including two opposed arms positioned in contiguity with the side walls of the housing and a connecting portion stretched across and in general contiguity with the bottom wall of the housing, said arms each having a bent over free end arranged to resiliently cooperate with an associated recess formed in the top wall of said housing thereby to snap said clip into engagement with the housing of said cartridge, said connecting portion disposed adjacent to and rearwardly of said resilient coupler and extending in a direction perpendicular to the longitudinal axis of the drive rod, said connecting portion being disposed underneath a portion of said drive rod and in spaced adjacency relative to said portion of said drive rod, said clip being operably independent of said stylus assembly and normally spaced therefrom when said clip is arranged on said housing, thereby to captivate said stylus assembly in said housing and prevent disengagement of said drive rod from said coupler while not in any way interfering with the normal operation of said stylus assembly.

References Cited by the Examiner

UNITED STATES PATENTS

| | | | |
|---|---|---|---|
| 2,754,372 | 6/1956 | Weathers | 274—13 |
| 2,931,658 | 4/1960 | Wood | 274—37 X |
| 3,054,862 | 9/1962 | Hammond | 179—100.41 |
| 3,088,743 | 5/1963 | Di Mattia et al. | 274—37 X |

FOREIGN PATENTS

| | | |
|---|---|---|
| 1,218,480 | 12/1959 | France. |

OTHER REFERENCES

German publication application 1,090,442, October 6, 1960.

NORTON ANSHER, *Primary Examiner.*